United States Patent [19]

Yamamoto et al.

[11] Patent Number: 4,705,380

[45] Date of Patent: Nov. 10, 1987

[54] AUTOMATIC FOCUSING DEVICE

[75] Inventors: Hiroshi Yamamoto; Akira Akashi, both of Kanagawa, Japan

[73] Assignee: Canon Kabushiki Kaisha, Tokyo, Japan

[21] Appl. No.: 910,342

[22] Filed: Sep. 19, 1986

Related U.S. Application Data

[63] Continuation of Ser. No. 719,681, Apr. 4, 1985, abandoned.

[30] Foreign Application Priority Data

Apr. 4, 1984 [JP] Japan .................................. 59-67203

[51] Int. Cl.$^4$ .............................................. G03B 3/10
[52] U.S. Cl. ..................... 354/402; 352/140
[58] Field of Search ..................... 354/400, 402, 195.1, 354/195.12; 352/140

[56] References Cited

U.S. PATENT DOCUMENTS

| 3,972,056 | 7/1976 | Tsujimoto et al. | 354/195.1 |
| 4,157,217 | 6/1979 | Isono | 352/140 |
| 4,161,756 | 7/1979 | Thomas | 352/140 |
| 4,238,143 | 12/1980 | Shenk | 354/400 |
| 4,290,679 | 9/1981 | Vockenhuber | 352/140 |
| 4,389,106 | 6/1983 | Maruyama | 352/140 |
| 4,477,167 | 10/1984 | Ishikawa et al. | 354/400 |
| 4,550,994 | 11/1985 | Maruyama | 354/402 |
| 4,561,746 | 12/1985 | Matsuda et al. | 354/400 |

Primary Examiner—Russell E. Adams
Attorney, Agent, or Firm—Fitzpatrick, Cella, Harper & Scinto

[57] ABSTRACT

In the disclosed automatic focusing device for a zoom lens the in-focus position for a particular object distance varies with changes in the focal length. The device detects the amount of variation of the focal length of the zoom lens, and continuously drives the focusing lens.

3 Claims, 4 Drawing Figures

AUTOMATIC FOCUSING DEVICE

BACKGROUND OF THE INVENTION

1. Field of the Invention:

This is a continuation of application Ser. No. 719,681, filed Apr. 4, 1985 now abandoned.

This invention relates to automatic focusing devices, and more particularly to a device for automatically adjusting the position of a focusing lens member in a zoon lens as the in-focus position for the same object varies with variation of the focal length of the entire system.

2. Description of the Prior Art:

Known zom lenses, such as the rear focus type, have focusing members whose in-focus position varies as the focal length changes although the object remains at the same distance. In such zoom lenses, the in-focus position of the member focusing on the object depends on the present value of the focal length. Hence, if one zooms after the lens has been set in sharp focus, the image plane for the object shifts. This will be explained by using FIG. 1.

Figure 1:
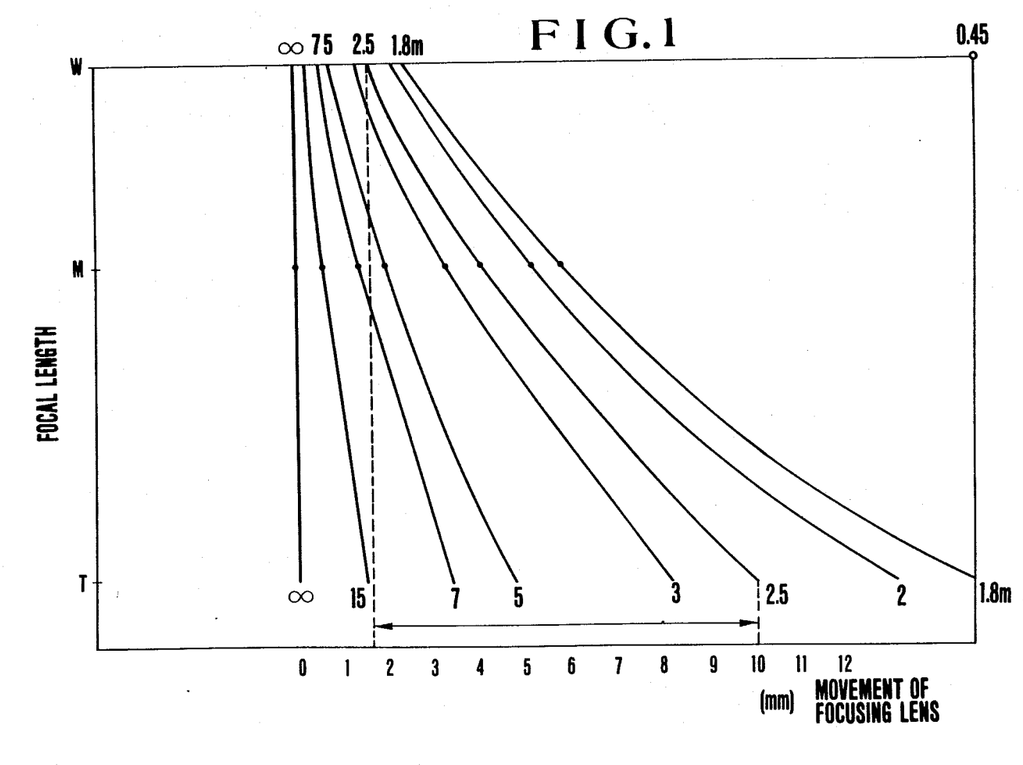
FIG. 1 is characteristic curves illustrating the relationship of the position of the focusing member with the focal length for various object distances in the zoom lens of the rear focus type.

FIG. 1 shows the relationship, in a rear focus type zoom lens, between the focal length and the distance a focusing member moves from its infinity position, i.e. with an object at infinity, for a number of discrete values of object distance. Here, the ordinate is the focal length, and the abscissa is the amount the focusing member moves. As is obvious from the curves of this graph in FIG. 1, a zoon lens of the rear focus type exhibits a common characteristic for all object distances except infinity. Specifically, the in-focus position or the movement of the focusing member varies as a quadratic function of the focal length with an object at a particular distance. In other words, while the focusing member is held stationary during zooming, the image plane shifts so that the image sharpness on the film plane decreases. Also, the amount the focusing member is required to move for the same change of focal length increases as the object distance decreases. For example, in the zoon lens of the rear focus type specified by FIG. 1, to focus from infinity to an object distance of about 2.5 meters at a wide angle end and bring the plane of a sharp image of the object into coincidence with the film plane in the camera requires the focusing member to move axially only 1.7 mm or thereabout. But at the telephoto end the focusing lens member must be moved forward by a distance as long as about 10 mm.

Such problems of the zoon lens may be alleviated by relying on the action of an automatic focusing device that responds to detection of the movement of the image plane to move the focusing lens to an in-focus position, as, for example, disclosed in U.S. Pat. No. 3,972,056. But this permits compensation for the image shift to follow zooming only when the object is bright enough to allow the image sharpness detector to respond rapidly, or when the zoom speed is slow. If the object is dim, or the zoom actuator is operated quickly, the automatic focusing device is unable to catch up to the movement of the image plane and compensate for it.

In such a case, the object image on the film plane is confused enough so that the image sharpness detector becomes unable to carry out a normal focus detecting operation. Therefore, the automatic focusing device is switched to a so-called "search" mode in which the focusing lens member is first moved arbitrarily in the forward or backward directions. If this selected direction coincides with that in which the focusing lens member approaches the in-focus position, it will take the minimum time to establish the in-focus condition. But when it coincides with the opposite direction, a far longer time is needed for the focusing lens member to reach the in-focus position. This increases the possibility that quick actuation of the zoom ring will cause a photographer to miss a good opportunity to snap a picture.

SUMMARY OF THE INVENTION

An object of the invention is to provide an automatic focusing device for a zoom lens having a focusing member whose in-focus position for the same object varies with variation of the focal length of the entire system, wherein the shift of the image plane resulting from zooming can be rapidly compensated for.

Another object of the invention is to provide an automatic focusing device in which when the zoom ring lies near or at the telephoto end where the amount of shift of the image plane of the zoom lens is particularly large, the focusing member is made continuously driven to move by detecting the position of the lens, thereby the focusing operation can be performed within a short time.

Still another object of the invention is to provivde an automatic focusing device in which when largely out of focus, the focusing member is continuously driven to move for a prescribed time so that the focusing member is moved a long distance, thereby the time from the start of motion to the reach of the in-focus condition is shortened, and which is provided with means for porperly judging which direction the focusing member is to be moved to.

DETAILED DESCRIPTION OF THE PREFERRED EMBODIMENT

Figure 2:
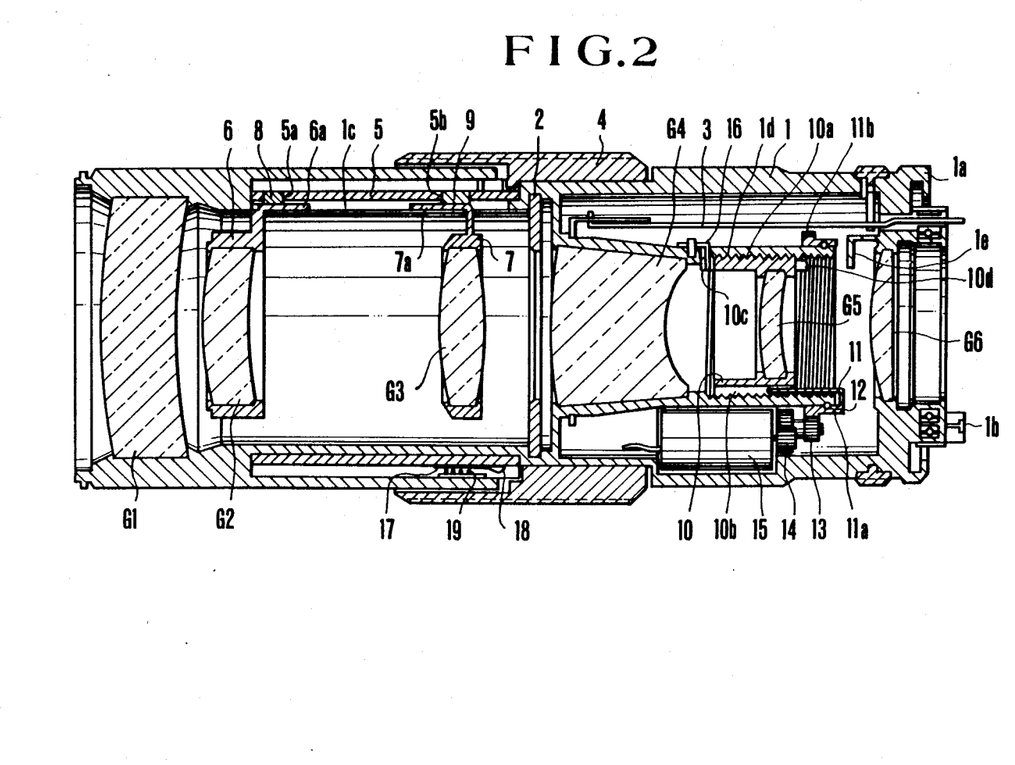
FIG. 2 is a longitudinal section view of a zoom lens of the rear focus type with a mechanical mounting therefor employing the device of the invention.
Figure 3:
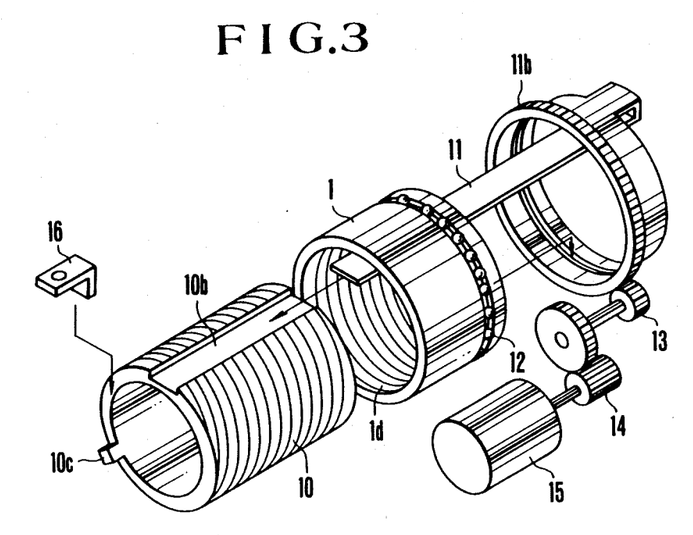
FIG. 3 is an exploded perspective view of the focusing mechanism of FIG. 2.

FIG. 2 illustrates an embodiment of the invention applied to a zoom lens, in this instance, of the rear focus type. FIG. 3 illustrates the details of the operating mechanism for the focusing lens member.

Here, 1 is the main body or body tube of a lens barrel barrel having a mount portion 1a by which it is coupled with a camera body (not shown). The mount portion 1a has electrical contact pins 1b through which electrical signals from the camera body pass to a lens drive control. In the body tube 1 a diaphragm unit 2 has an actuating member 3 operable with a control mechanism therefor in the camera body. A zoom ring 4 is rotatably fitted on the outer diameter of the body tube 1 and is drivingly connected to a cam sleeve 5 which is rotatable about an optical axis. The cam sleeve 5 has two camming slots 5a and 5b into which radial cam followers or rollers 8 and 9 extend from variator and compensator cells 6 and 7. These combinations of the rollers 8 and 9 and the camming slots 5a and 5b each are at least three in number, thus serving as a stabilizer against tilting with respect to the optical axis. An longitudinally elongated slot 1c is formed in the body tube 1 and receives a key portion 6a of the variator cell 6 and another key portion 7a of the compensator cell 7. The variator and compensator are represented by lenses G2 and G3 of different power respectively. A front or first lens G1 is fixedly secured to the body tube 1, and focusing is performed at a fifth lens G5 which moves axially while rotating about the optical axis. This lens G5 is mounted in a movable sleeve 10 having male screw threads 10a cut in the outer surface thereof and meshing with female screw threads 1d provided in the inner surface of the body tube 1. The movable sleeve 10 is provided with at least one axial key groove 10b in which is fitted a fork 11. The fork 11 and key groove 10b though rotating as a unit about the optical axis are axially movable relative to each other. A bearing portion of the fork 11 is provided with a ball race 11a so that the bearing portion is rotatable through balls 12 relative to the body tube 1. At the end of its extended portion gear teeth 11b mesh with one of a double gear 13, the other gear of which meshes with a pinion 14. The double gear 13 is associated with a pulse generator (not shown) for producing a signal representing the amount of rotation of the output shaft of an electric motor 15. The pinion 14 is fixedly mounted on the output shaft of the motor 15 so that the driving power of the motor 15 is transmitted to the fork 11.

To limit the forward axial movement of the sleeve 10 a front extension 10c cooperates with an "L" shaped stopper 16 fixedly secured to the body tube 1 by a screw fastener so that when the rotating sleeve 10 moves axially forward and reaches the front most position, the extension 10c abuts the stopper 16. Then, the sleeve 10 can no longer rotate and, therefore, no longer, move forward. The rear end of the sleeve 10 has a similar extension 10d that cooperates with a stopper 1e formed in a portion of the body tube 1.

In operating the focusing lens G5, a range finder system of known construction (not shown) controls rotation of the electric motor 15. As the motor 15 rotates, the pinion 14 rotates the double gear 13 and further the gear 11b. By this operation, the fork 11 is rotated about the optical axis, while pushing the key groove 10b of the sleeve 10 at either side thereof to rotate the sleeve 10. Because the sleeve 10 is screw-threadedly connected to the body tube 1, as the sleeve 10 rotates, the lens G5 held in the sleeve 10 is axially moved. The use of such small-size lens component as the focusing lens is very advantageous from the motorized focusing standpoint. That is, thanks to the low load resistance and the small inertia of the load the mechanical factors of the driving system are minimized, thereby it being made possible to achieve an improvement of the responsibility in focusing adjustment.

Figure 4:
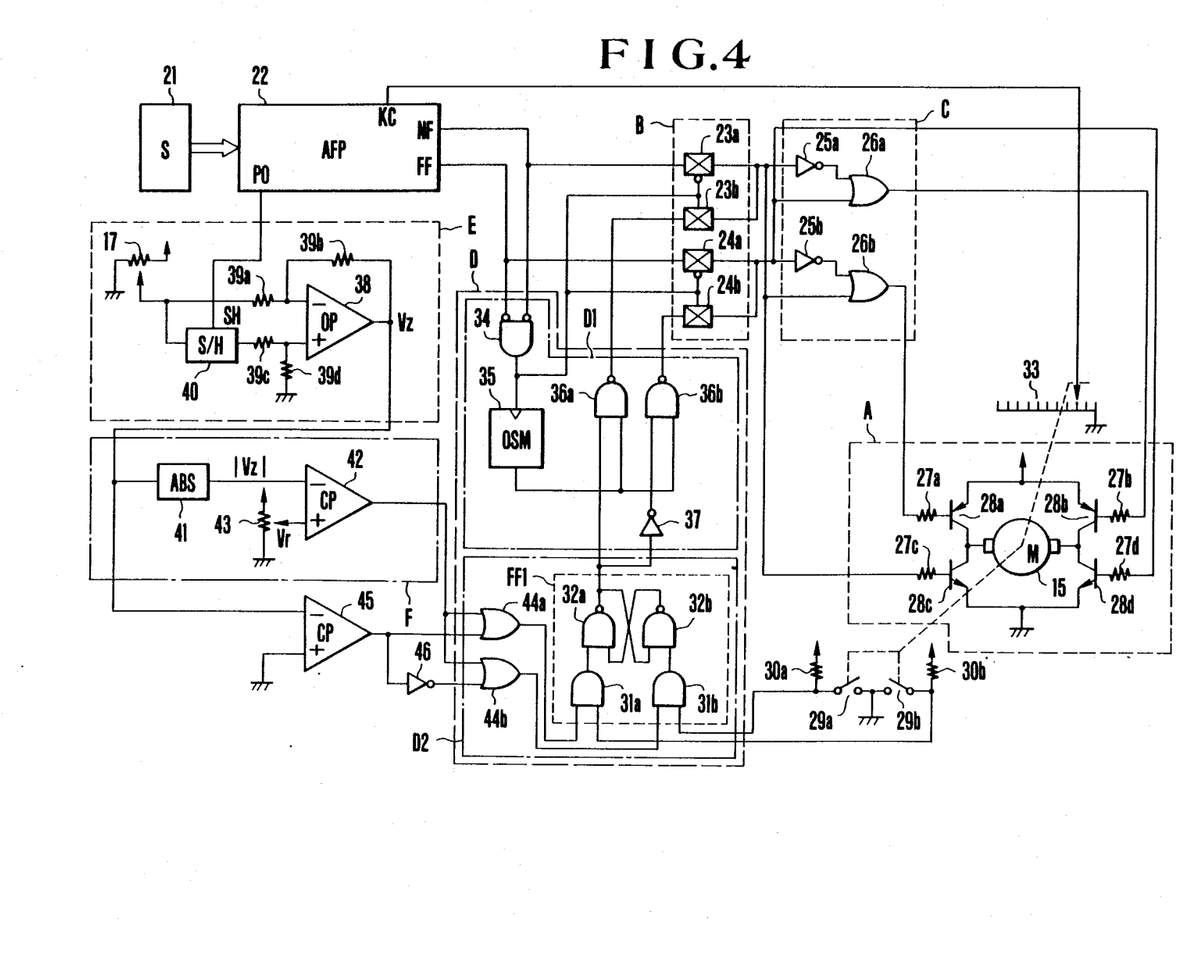
FIG. 4 is an electrical circuit diagram of an embodiment of an automatic focusing device according to the present invention.

Meanwhile, the zoom optical section has a resistance 17 of analog information arranged on the outer periphery of the zoom cam sleeve 5 and connected at one end thereof through a cable 18 to a computer circuit (FIG. 4). A brush 19 is slidably in contact with this resistance 17 to read out a value of resistance. That is, the actual value of the focal length is converted to the corresponding value of resistance from which an electrical information is obtained to determine the position of the zoom components.

In FIG. 4 shows a practical example of the circuitry of the automatic focusing device of the invention. An image sensor 21 is positioned to receive an image formed by the aforesaid zoom lens and produces an electrical signal representing the degree of focus of the image which is processed by an in-focus detector 22 (hereinafter referred to as "AFP"). When the image on the film plane of the camera is in sharp focus, both of outlets NF and FF assume a high potential (hereinafter abbreviated as "H" level). When in near focus, the outlet NF is H level, and the FF becomes low potential (hereinafter abbreviated as "L" level). When in far focus, the NF is changed to L level and the FF is changed to H level. And, when the degree of focus of the image is impossible to measure due to either the so-called "confusion" or the low contract of the object, a signal of L level is produced at each of the outlets NF and FF.

The circuit of FIG. 4 further includes current supply control means for an electric motor M in block A, switching means in block B and means for determining the direction of rotation of the motor M in bock C.

The motor control means A is constructed with transistors 28a, 28b, 28c and 28d and resistors 27a, 27b, 27c and 27d. Which of the transistors 28a to 28d are conducting or non-conducting is determined by the combinations of the levels of the outputs NF and FF of AFP 22. In detail, when in sharp focus, or both of the outputs NF and FF are H level, the transistors 28a and 28b are OFF and the 28c and 28d are ON, both ends of the winding of the motor 15 are electrically grounded to give a braking effect. When in near focus, or the output NF is H level, and the output FF is L level, the transistors 28b and 28c turn on and the others 28a and 28d turn off, thereby the motor 15 is supplied with current flowing from the right hand terminal to the left hand terminal. When in far focus, or the output FF is H level and the output NF is L level, the transistors 28a and 28d turn on and the others 28b and 28c turn off, thereby the motor 15 is supplied with current flowing from the left hand terminal to the right hand terminal. And, when impossible to measure the degree of focus, or both outputs NF and FF are L level, all the transistors 28a to 28d turn off, releasing the motor 15 electrically.

The switching means B is constructed with four relay switches or analog type switches, 23a, 23b, 23c and 23d.

The rotation direction discriminating means C includes inverters 25a and 25b and OR gates 26a and 26b. The inverter 25a has an input which is connected to the output of the switch 23a and also to the base of the transistor 28c through the resistor 27c, and has an output which is connected to one of two inputs of the OR gate 26a, the other input of which is connected to the output of the switch 24a. The other inverter 25b has an input which is connected both to the output of the switch 24a and to the base of the transistor 28d through the resistor 27d and has an output which is connected to one of the two inputs of the OR gate 26b, the other input of which is connected to the output of the switch 23a. The outputs of the OR gates 26a and 26b are connected to the bases of the transistors 28b and 28a through the resistors 27b and 27a respectively.

Block D represents first control means comprising lens movement information detecting means $D_1$ and motor continuous rotation detecting means $D_2$. The lens movement information detecting means $D_1$ is constructed with a NOR gate 34 having two inputs connected to the output terminals NF and FF of the aforesaid AFP, a mono-stable multivibrator (hereinafter referred to as "OSM") 35, NAND gates 36a and 36b and an inverter 37. The motor continuous rotation detecting means D2 is constructed with a flip-flop FF₁ and OR gates 44a and 44b, the FF₁ comprising AND gates 31a and 31b and NAND gates 32a and 32b. The output of the aforesaid NAND gate 34 is connected to each of the control inputs of the aforesaid switching means 23a, 23b, 23c and 23d and also to the input of the OSM 35. The output of the OSM 35 is connected to the NAND gates 36a and 36b at one inputs thereof, the other of which are connected respectively to the output of the aforesaid NAND gate 32 and the output of the inverter 37.

When the image is confused enough to render measurement of the degree of focus impossible, the AFP22 produces outputs of L level at the terminals NF and FF. Responsive to this, the NOR gate 34 produces an output signal of H level by which the switches 23b and 24b are rendered conducting. Also, in synchronism with the rising edge of the output of the NOR gate 34 to H level, the output of OSM 35 is changed to H level and maintained at H level for a prescribed time, during which the signals of L level are applied from the NAND gates 36a and 36b to the switches 23b and 24b respectively. Since the other inputs of the 2-input NAND gates 36a and 36b are supplied with the output of the FF₁ and its inverted output by the inverter 37 respectively, it is only during the prescribed time that the inversion of the signal of H level, or a signal of L level from the OSM 35 is applied to either one of the switches 23b and 24b depending upon the binary condition of the output of the FF₁. Thus, the motor 15 is driven to rotate either in the normal direction, or in the reverse direction continuously only for the time determined by the OSM 35, or the "search" mode is operated. Which direction the mode is to be operated in is determined by the binary condition of the output of the FF₁ which is selectively determined by which of switches 29a and 29b at the limits of the focusing range for the minimum object distance and infinity respectively is operated and the amount and direction of displacement of the zoom ring 4.

A pulse generating means 33 has a grounded comb-like electrode and is connected to the output shaft of the motor 15 so that as the motor 15 rotates, it produces an output signal in the form of pulses which is applied to a terminal KC of the AFP 22.

The AFP 22 counts up the number of pulses produced from the pulse generating means 33 to detect the amount of movement of the focusing member G5. When the number of pulses counted reaches a value representing the distance the focusing member G5 must be moved to the in-focus position, the outputs NF and FF are both changed to H level, and the motor M is stopped from further rotation.

The switches 29a and 29b and pull-up resistors 30a and 30b constitute means for detecting when the focusing member G5 reaches either one of the terminal ends of total movement. The switches 29a and 29b are arranged to operate with either the output shaft of the motor M or the focusing lens holder 10. When the focusing member G5 reaches a point near or at the limit of the focusing range for the minimum object distance, the switch 29a is turned on. At a point near or at the opposite limit of the focusing range for the infinite distance, the switch 29b is turned on. One contact of each of the switches 29a and 29b is grounded, and the other contact is connected to the aforesaid AND gate 31a, 31b. When either the switch 29a or the switch 29b is turned on, the output of the FF₁ changes from H level to L level or from L level to H level.

Block E is a means for producing a signal representing the difference between the value of the focal length of the zoom lens taken at the time of the termination of one cycle of degree-of-focus measuring operation and the value of the focal length at the time of the termination of the preceding cycle of degree-of-focus measuring operation, or difference signal (Vz). This means is constructed with the variable resistor 17 that, as shown in FIG. 2, cooperates with the zoom cam sleeve 5, a difference amplifier 38 and a sample-hold circuit 40. The sample-hold circuit 40 (S/H) has two inputs which are connected to a terminal PO of the AFP 22 and the output of the variable resistor 17 and an output which is connected through a resistor 39c to a positive input terminal of the difference amplifier 38, of which the negative input terminal is connected through a resistor 39a to the output of the variable resistor 17.

Block F represents means for detecting the amount of variation of the focal length and includes a circuit 41 receptive of the difference signal Vz for producing an output representing the absolute value of the difference or $|Vz|$ and a comparator 42 for comparing the output of the absolute value circuit 41 with a predetermined reference potential Vr at the output of a resistor 43. The output of the comparator 42 is H level when $|Vz|<Vr$, and L level when $|Vz|>Vr$. This output is applied to the OR gates 44a and 44b.

The output of the difference signal forming means 38, or Vz, is also applied to a negative input of a comparator 45 for detecting the direction of variation of the focal length. Because its positive input is grounded, the output of the comparator 45 is H level when $Vz<0$, and L level when $Vz>0$. The output of the comparator 45 is applied both to the other input of the OR gate 44a and through an inverter 46 to the other input of the OR gate 44b. Therefore, the outputs of the OR gates 44a and 44b take H level when the amount of variation is small. When it is large, either one of the OR gates 44a and 44b produces an output signal of L level depending on the increase or decrease of the focal length.

The outputs of the OR gates 44a and 44b are each connected to one input of the respective 2-input AND gates 31a and 31b whose other inputs of which are connected to the switches 29a and 29b respectively. Hence, either when the zoom ring moves at a high speed, or when the focusing member G5 arrives at the terminal end of movement for the minimum object distance or infinity, the circuit FF1 determines which direction the searching operation must take is determined, or the direction of the searching operation is reversed, as the output of the FF₁ changes from H to L level or from L to H level.

The operation of this electrical circuit is as follows: Assuming that as the focusing lens G5 is being moved by the motor 15, when the image comes to a sharp focus sensed by the sensor 21, the AFP 22 changes its outputs NF and FF to H level. At this time, the output of the NOR gate 34 is L level. Hence, outputs of the OSM 35 is L level, and NAND gates 36a and 36b are H level. Therefore, the switches 23a and 24a are rendered conducting, and the switches 23b and 24b are rendered non-conducting, that is, the common output of each pair becmes H level, the motor 15 is suddenly stopped with the help of the electrical brake.

Assuming again that the image is of near focus, then the output NF is H level and the output FF is L level, causing the switches 23a and 24a to become conducting. Therefore, the pair of switches 23a and 23b produces an output of H level, and the pair of switches 24a and 24b produces an output of L level. Hence, the motor 15 is supplied with current flowing from the right to the left in FIG. 4. As the focusing lens G5 is moved axially forward, the corresponding number of pulses to the distance the lens G5 has moved are applied to the terminal KC of the AFP 22 and are counted. When the number of pulses counted reaches a certain value, the image is brought into sharp focus. At this time, the outputs NF and FF both assume H level, thus stopping the rotation of the motor 15 with the help of the braking action.

In the case of far focus, the motor 15 rotates in the reversed direction. The other parts operates in a similar manner to that described in connection with the case of near focus.

Alternatively assuming that as the object is replaced by another one, or the zoom ring 4 is rapidly turned, the image is so greatly confused as to make it impossible to measure the degree of focus, then the outputs NF and FF both take L level. Responsive to this, the NOR gate 34 changes its output to H level, thereby the switches 23b and 24b are rendered conducting, and the switches 23a and 24a are rendered non-conducting. Such change of the output of the NOR gate 34 to H level also causes the OSM 35 to produce a pulse of the prescribed duration which is then applied to the NAND gates 36a and 36b at one inputs thereof. Since, at this time, the other inputs of the NAND gates 36a and 36b are supplied respectively with a signal representing the information memorized in the NAND gates 32a and 32b constituting the flip-flop circuit and its inverted signal by the inverter 37, either one of the NAND gates 36a and 36b changes its output to L level. This output is maintained at L level for the above-defined time. Because the outputs of the NAND gates 36a and 36b are connected to the switches 23b and 24b which for now are conducting, the pair of switches 23a and 23b and the pair of switches 24a and 24b pass the outputs of the NAND gates 36a and 36b therethrough. Thus, the motor 15 performs a "searching" operation either in the normal direction or in the reverse direction only during the time determined by the OSM 35.

In this connection it should be explained that as the turned position of the zoom ring 4 is compared with the starting position at which the latest focusing operation was terminated, if the distance between these two positions is found to be very long, it is judged that a quite quick actuation of the zoom ring 4 has given the cause of confusion of the image with a high possibility. Then, searching is carried out in the one of the two directions which can bring the image into focus in a shorter time than when the opposite direction would be selected. If that distance is short, on assumption that the cause is rather attributable to a large change of the object distance, determination of the searching direction is not made. That is, when the output of the comparator 42 becomes L level, which direction the searching is to operate in is determined depending on the output of the comparator 45. And, as the searching operation goes on, when the focusing member G5 arrives at either of the limits of focusing range for the minimum object distance and infinity, the corresponding one of the switches 29a and 29b is actuated to reverse the direction of the searching operation.

As has been described above, according to the present invention, the automatic focusing device enables the rear focus type zoom lens to compensate for any large image shift resulting from quick actuation of the zoom ring. Moreover, even when the image is greatly confused, the meaningless operation that seeks for an infocus position haphazardly does not take place. This made it possible to achieve a minimization of the time necessary to establish the in-focus condition.

What is claimed is:

1. An auto-focussing device for a single lens reflex camera, comprising:
   a focus lens for forming an image of an object:
   a zoom lens for zooming, located on the object side of said focus lens;
   in-focus detection computing means for outputting an electrical signal corresponding to the in-focus state obtained by said focus lens and an in-focus state caused by a focal point movement by the zooming action of said zoom lens;
   a motor for moving said focus lens;
   Power supply control means for controlling power supplied to the motor;
   means for detecting an amount of change in the focal length on the basis of comparison between focal length information of a preceding operation and a focal length of an instant operation;
   means for detecting the direction of the change on the basis of the comparison; and
   first control means for operating said power supply control means by inputting signals from the focal point detection computing means, the focal length change amount detection means and the change direction detecting means; said first control means including;
   means for continuously operating said power supply control means for a prescribed time when the infocus state is largely deviated on the basis of the signal from the focal point detection computing means, and
   means for determining the rotation direction of said motor on the basis of the signal from the change amount detection means and the change direction detection means.

2. An auto-focussing devcie for a single lens reflex camera, comprising:
   a focus lens for focussing an image of an object;
   a zoom lens for zooming, located on the object side of said focus lens;
   focal point detection computing means for outputting a signal of out-of-focus caused by the movement of a focal point by the zooming action of said zoom lens;
   a motor for moving said focus lens;
   power supply control means for controlling power supplied to said motor;
   means for detecting amounts of change in the focal length between a preceding focal length changing operation and an instant focal length changing operation;
   means for detecting an information representing the direction of change in the focal length on the basis of the comparison between the preceding focal length information and the instant focal length information;
   means for detecting the position of the focus lens;

switch means for changing over a current passage and a current passage direction to the power supply control means;

control means for controlling the operation of said switch means; said control means including:

means for outputting a signal for continuously opening the switch means for a prescribed time when the focus lens deviates largely from the in-focus state on the basis of the signal from the focal point detection computing means; and means for outputting a signal for changing over said switch means to determine the rotation direction of the motor on the basis of the signals from the change amount detection means, the change direction detection means and the lens position detection means.

3. An auto-focusing system, comprising:

an optical system having a focus lens unit and a zoom lens unit for zooming, arranged on the object side of the focus lens unit;

focus detecting means for detecting a focus adjustment to be made for the optical system with reception of light passing through the optical system;

change-direction detecting means for detecting a direction of change in a focal length of the optical system by comparing a preceding focal length of the optical system with a present focal length of the optical system;

operation means for determining an amount of adjustment for the focus lens unit on the basis of outputs of the focus detecting means;

drive means for driving the focus lens unit in accordance with the amount of adjustment; and control means for controlling the drive means on the basis of the direction detected by the change-direction detecting means so as to move the focus lens unit in a detected direction.

* * * * *

UNITED STATES PATENT AND TRADEMARK OFFICE
CERTIFICATE OF CORRECTION

PATENT NO. : 4,705,380  
DATED : November 10, 1987  
INVENTOR(S) : HIROSHI YAMAMOTO, ET AL.

Page 1 of 3

It is certified that error appears in the above-identified patent and that said Letters Patent is hereby corrected as shown below:

COLUMN 1

Line 5, "1. Field of the Invention:" should be between lines 7 and 8 of Column 1.
Line 15, "zom" should read --zoom--.
Line 31, "zoon" should read --zoom--.
Line 41, "zoon" should read --zoom--.
Line 50, "zoon" should read --zoom--.

COLUMN 2

Line 25, "provivde" should read --provide--.
Line 31, "porperly" should read --properly--.
Line 57, "barrel" should be deleted.

COLUMN 3

Line 4, "An" should read --A--.
Line 36, "front most" should read --frontmost--.
Line 38, "longer," should read --longer--.
Line 55, "load" should read --load,--.
Line 58, "responsibility" should read --responsivity--.

COLUMN 4

Line 1, "In" should be deleted.
Line 16, "contract" should read --contrast--.
Line 22, "bock C." should read --block C.--.

UNITED STATES PATENT AND TRADEMARK OFFICE
CERTIFICATE OF CORRECTION

PATENT NO. : 4,705,380
DATED : November 10, 1987
INVENTOR(S) : HIROSHI YAMAMOTO, ET AL.

It is certified that error appears in the above-identified patent and that said Letters Patent is hereby corrected as shown below:

<u>COLUMN 5</u>

Line 16, "AFP22" should read --AFP 22--.

<u>COLUMN 6</u>

Line 52, "FF1" should read --$FF_1$--.
    Line 53, "is deter-" should be deleted.
    Line 54, "mined" should be deleted.
    Line 67, "becmes" should read --becomes--.

<u>COLUMN 7</u>

Line 18, "operates" should read --operate--.
    Line 18, "reversed" should read --reverse--.

UNITED STATES PATENT AND TRADEMARK OFFICE
CERTIFICATE OF CORRECTION

PATENT NO. : 4,705,380   Page 3 of 3
DATED : November 10, 1987
INVENTOR(S) : HIROSHI YAMAMOTO, ET AL.

It is certified that error appears in the above-identified patent and that said Letters Patent is hereby corrected as shown below:

<u>COLUMN 8</u>

Line 10, "made" should read --makes--.
    Line 24, "Power" should read --power--.
    Line 37, "including;" should read --including:--.
    Line 40, "infocus" should read --in-focus--.
    Line 47, "devcie" should read --device--.

Signed and Sealed this

Thirty-first Day of January, 1989

Attest:

DONALD J. QUIGG

Attesting Officer    Commissioner of Patents and Trademarks